United States Patent
Shmueli et al.

(10) Patent No.: US 10,436,108 B2
(45) Date of Patent: *Oct. 8, 2019

(54) INTERNAL COMBUSTION ENGINE USING A WATER-BASED MIXTURE AS FUEL AND METHOD FOR OPERATING THE SAME

(71) Applicant: Maymaan Research, LLC, Hollywood, FL (US)

(72) Inventors: Yehuda Shmueli, Davie, FL (US); Eitan Shmueli, Davie, FL (US); Doron Shmueli, Hollywood, FL (US)

(73) Assignee: MAYMAAN RESEARCH, LLC, Hollywood, FL (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/025,157

(22) PCT Filed: Sep. 24, 2014

(86) PCT No.: PCT/US2014/057301
§ 371 (c)(1),
(2) Date: Mar. 25, 2016

(87) PCT Pub. No.: WO2015/048187
PCT Pub. Date: Apr. 2, 2015

(65) Prior Publication Data
US 2016/0222878 A1     Aug. 4, 2016

Related U.S. Application Data

(63) Continuation of application No. 14/036,952, filed on Sep. 25, 2013, now Pat. No. 8,869,755.

(51) Int. Cl.
F02B 47/02    (2006.01)
F02M 25/022   (2006.01)
(Continued)

(52) U.S. Cl.
CPC ............. *F02B 47/02* (2013.01); *F02B 61/00* (2013.01); *F02D 19/0644* (2013.01);
(Continued)

(58) Field of Classification Search
CPC ...... F02B 47/02; F02D 19/0655; F02D 19/12; F02M 25/0228; F02M 43/00; Y02T 10/36
See application file for complete search history.

(56) References Cited

U.S. PATENT DOCUMENTS 2,789,802 A    4/1957   Heftier
3,738,576 A    6/1973   O'Neill
(Continued)

FOREIGN PATENT DOCUMENTS

CN    102518533 A    6/2012
CN    202348489 U    7/2012
(Continued)

OTHER PUBLICATIONS

College of the Desert, "Module 3: Hydrogen Use in Internal Combustion Engines," Hydrogen Fuel Cell Engines and Related Technologies: Rev 0, Dec. 2011, 29 pages.
(Continued)

*Primary Examiner* — Marguerite J McMahon
*Assistant Examiner* — Teuta B Holbrook
(74) *Attorney, Agent, or Firm* — Seed Intellectual Property Law Group LLP

(57) ABSTRACT

An internal combustion engine includes a cylinder with a combustion chamber and a piston selectively changing the volume of the combustion chamber. The combustion chamber receives a mixture of air, hydrogen and a liquid fuel consisting essentially of water and a flammable, preferably non-fossil, substance. The contents of the combustion chamber are ignited generating power.

25 Claims, 4 Drawing Sheets

(51) Int. Cl.
*F02D 19/06* (2006.01)
*F02D 19/12* (2006.01)
*F02B 61/00* (2006.01)
*F02M 43/00* (2006.01)

(52) U.S. Cl.
CPC ......... *F02D 19/0655* (2013.01); *F02D 19/12* (2013.01); *F02M 25/0227* (2013.01); *F02M 25/0228* (2013.01); *F02M 43/00* (2013.01); *Y02T 10/121* (2013.01); *Y02T 10/36* (2013.01)

(56) References Cited

U.S. PATENT DOCUMENTS

| | | | |
|---|---|---|---|
| 4,019,968 A | 4/1977 | Spaziante et al. | |
| 4,111,160 A | 9/1978 | Talenti | |
| 4,170,200 A | 10/1979 | Takeuchi et al. | |
| 4,249,645 A | 2/1981 | Level et al. | |
| 4,442,801 A | 4/1984 | Glynn et al. | |
| 4,484,444 A | 11/1984 | Bidwell | |
| 4,509,464 A | 4/1985 | Hansen | |
| 4,565,548 A | 1/1986 | Davis et al. | |
| 4,993,386 A * | 2/1991 | Ozasa | F01M 3/02 123/1 A |
| 5,007,381 A | 4/1991 | Kakegawa et al. | |
| 5,156,114 A | 10/1992 | Gunnerman | |
| RE35,237 E * | 5/1996 | Gunnerman | C10L 1/023 123/1 A |
| 5,546,908 A | 8/1996 | Stokes | |
| 5,951,722 A | 9/1999 | Sanders et al. | |
| 5,992,397 A | 11/1999 | Hideaki et al. | |
| 6,010,544 A | 1/2000 | Haldeman et al. | |
| 6,238,814 B1 | 5/2001 | Horiguchi et al. | |
| 6,294,587 B1 | 9/2001 | Wittenbrink et al. | |
| 6,302,929 B1 | 10/2001 | Gunnerman | |
| 6,524,453 B1 | 2/2003 | De Souza et al. | |
| 6,533,919 B1 | 3/2003 | Narayanan et al. | |
| 6,748,905 B2 | 6/2004 | Duncan et al. | |
| 6,866,756 B2 | 3/2005 | Klein | |
| 6,988,492 B2 | 1/2006 | Shetley | |
| 7,014,740 B2 | 3/2006 | Kim | |
| 7,188,607 B2 | 3/2007 | Kobayashi | |
| 7,191,737 B2 | 3/2007 | Klein | |
| 7,320,302 B2 * | 1/2008 | Kobayashi | F02B 1/12 123/299 |
| 7,367,306 B1 * | 5/2008 | Holden | F02B 47/02 123/25 C |
| 7,370,626 B2 | 5/2008 | Schubert | |
| 7,493,886 B2 | 2/2009 | Blank | |
| 7,578,281 B2 * | 8/2009 | Russell | F02P 15/02 123/304 |
| 7,597,068 B2 | 10/2009 | Arai et al. | |
| 7,597,072 B2 * | 10/2009 | Stein | F01L 13/0036 123/304 |
| 7,730,872 B2 * | 6/2010 | Leone | F01N 11/00 123/25 C |
| 7,770,545 B2 | 8/2010 | Morgenstern | |
| 8,187,347 B2 | 5/2012 | Sakuma et al. | |
| 8,469,009 B2 | 6/2013 | Munshi et al. | |
| 8,590,510 B2 * | 11/2013 | Surnilla | F02M 39/02 123/431 |
| 8,857,381 B2 * | 10/2014 | Roberts, Jr. | F02D 13/0203 123/1 A |
| 8,869,755 B2 * | 10/2014 | Shmueli | F02M 25/0228 123/25 E |
| 9,074,555 B2 * | 7/2015 | Shmueli | F02M 25/028 |
| 2004/0025809 A1 | 2/2004 | Cumming | |
| 2005/0229907 A1 | 10/2005 | Watanabe et al. | |
| 2006/0021867 A1 | 2/2006 | Zhang | |
| 2007/0119414 A1 * | 5/2007 | Leone | F02D 19/0684 123/295 |
| 2007/0193717 A1 | 8/2007 | Turini et al. | |
| 2007/0215125 A1 | 9/2007 | Dearth et al. | |
| 2007/0227492 A1 * | 10/2007 | Cheiky | F02B 31/00 123/304 |
| 2007/0227493 A1 * | 10/2007 | Cheiky | F02M 27/02 123/304 |
| 2007/0245720 A1 * | 10/2007 | Driscoll | F02D 19/081 60/286 |
| 2008/0017171 A1 * | 1/2008 | Stein | F02D 19/12 123/478 |
| 2009/0092887 A1 | 4/2009 | McGrath et al. | |
| 2009/0095546 A1 * | 4/2009 | Zubeck | F02B 1/02 180/54.1 |
| 2009/0194042 A1 | 8/2009 | Workman et al. | |
| 2009/0229541 A1 | 9/2009 | Shimasaki et al. | |
| 2010/0121559 A1 * | 5/2010 | Bromberg | F02M 25/0228 701/111 |
| 2010/0122902 A1 | 5/2010 | Shmueli et al. | |
| 2010/0206249 A1 | 8/2010 | Bromberg et al. | |
| 2010/0319635 A1 | 12/2010 | Morgenstern | |
| 2011/0132320 A1 * | 6/2011 | Ulrey | F02D 41/005 123/299 |
| 2011/0203917 A1 | 8/2011 | Shmueli et al. | |
| 2011/0209683 A1 * | 9/2011 | Simmons | C10L 1/023 123/25 C |
| 2012/0031352 A1 | 2/2012 | Ceremis et al. | |
| 2012/0037098 A1 | 2/2012 | Wey | |
| 2012/0037099 A1 | 2/2012 | Henry et al. | |
| 2012/0260886 A1 * | 10/2012 | Mulye | F02B 47/02 123/25 C |
| 2013/0030671 A1 | 1/2013 | Hoshi et al. | |
| 2013/0066493 A1 | 3/2013 | Martin et al. | |
| 2013/0318946 A1 | 12/2013 | Morris et al. | |

FOREIGN PATENT DOCUMENTS

| | | |
|---|---|---|
| DE | 19540993 C1 | 7/1997 |
| EP | 0 045 601 A1 | 2/1982 |
| EP | 0014992 B1 | 5/1983 |
| JP | 54-102422 A | 8/1979 |
| JP | 60-125762 A | 7/1985 |
| JP | 3-124929 A | 5/1991 |
| JP | 6-280696 A | 10/1994 |
| JP | 10-502717 A | 3/1998 |
| JP | 10-306750 A | 11/1998 |
| JP | 2002-38981 A | 2/2002 |
| JP | 2005-73224 A | 3/2005 |
| JP | 2005-290984 A | 10/2005 |
| JP | 2006-37064 A | 2/2006 |
| JP | 2007-278254 A | 10/2007 |
| JP | 2008-291726 A | 12/2008 |
| JP | 2009-74439 A | 4/2009 |
| JP | 2009-532606 A | 9/2009 |
| JP | 2009-540219 A | 11/2009 |
| JP | 2010-133328 A | 6/2010 |
| JP | 2010-185300 A | 8/2010 |
| JP | 2011-52606 A | 3/2011 |
| JP | 2011-508140 A | 3/2011 |
| RU | 2009 100 885 A | 7/2010 |
| RU | 2 414 609 C2 | 3/2011 |
| WO | 92/07922 | 5/1992 |
| WO | 2005/071230 A2 | 8/2005 |
| WO | 2007/056832 A1 | 5/2007 |
| WO | 2008/077204 A2 | 7/2008 |
| WO | 2011/055118 A1 | 5/2011 |
| WO | 2012/045743 A1 | 4/2012 |
| WO | 2012/066645 A1 | 5/2012 |

OTHER PUBLICATIONS

Gunnerman, "Water-Fuel Emulsion," RexResearch, retrieved from http://www.rexresearch.com/gunnrman/gunnrman.htm, on Apr. 6, 2016, 18 pages.

Wang et al., "Effect of hydrogen addition on combustion and emissions performance of a spark-ignited ethanol engine at idle and stoichiometric conditions," *International Journal of Hydrogen Energy* 35(17):9205-9213, Sep. 2010.

* cited by examiner

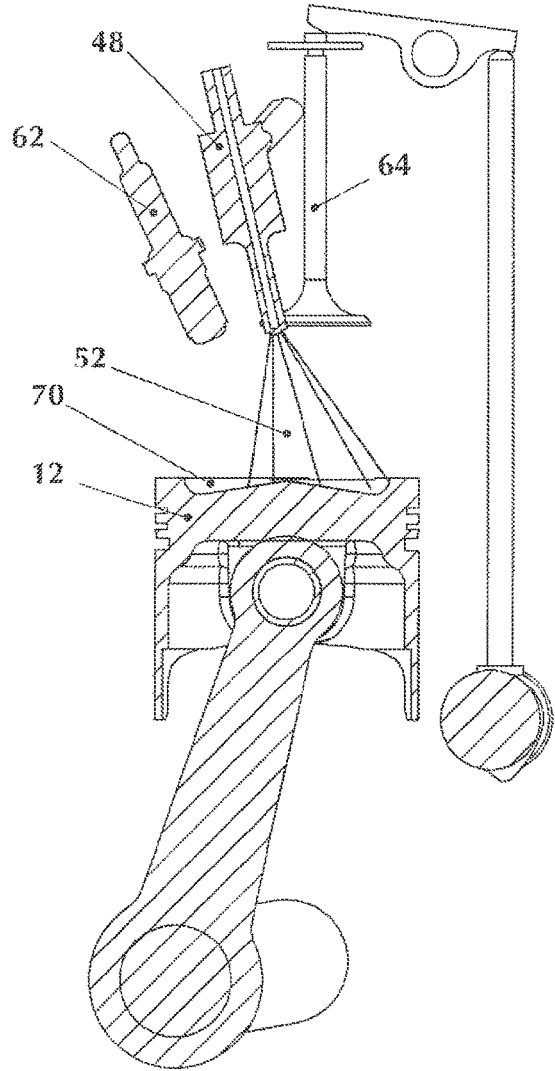
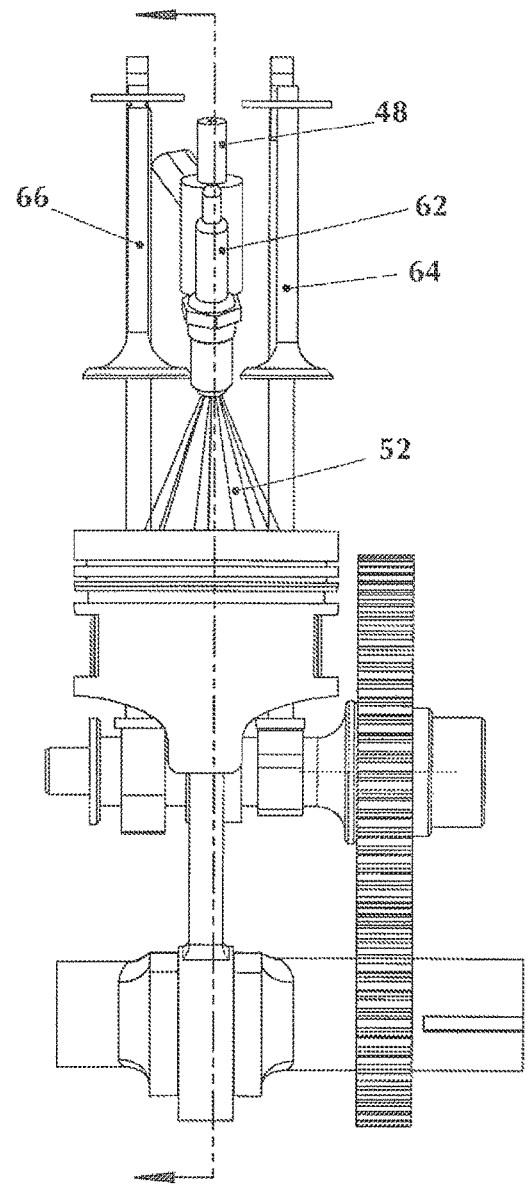
FIG.2A
FIG.2B

INTERNAL COMBUSTION ENGINE USING A WATER-BASED MIXTURE AS FUEL AND METHOD FOR OPERATING THE SAME

CROSS REFERENCE TO RELATED APPLICATION

This application claims the benefit under 35 U.S.C. § 119(e) to U.S. Non-Provisional application Ser. No. 14/036,952 filed on Sep. 25, 2013, which application is incorporated by reference herein in its entirety.

BACKGROUND

Technical Field

The present disclosure pertains to a method and apparatus for operating an internal combustion engine using a fuel consisting of water and a water-soluble flammable substance that is injected into a mixture of hydrogen and air.

Description of the Related Art

The use of fossil fuels for engines that are used, for example, in cars and other vehicles, as well as many other engines used for a variety of purposes, is based on a very old concept based on the internal combustion engines developed in the nineteenth century. Despite intense research and development for alternate fuels for the last 50 years, fossil fuel derived from petroleum or natural gas, is still essentially the primary source of energy almost all the internal combustion engines presently in use all over the world.

As a result, the world supply of fossil fuels have been severely depleted creating a shortage, and the price of oil has been climbing for the past 40 years. In addition such fuels are very polluting and some suggest that it has either been the primary cause or has contributed substantially to global warming. All these factors led to many efforts to find and harness renewable energy sources other than traditional fossil fuels. Several alternative fuels have been introduced in the past few years to reduce the impact of petroleum depletion, including hybrid cars, electric cars, bio diesel, hydrogen based cars, etc. However, none of these solutions were effective. One reason for this lack of success is that they require a completely new infrastructure for the production of the engines, as well as the production and distribution of the fuel. Moreover, most solutions proposed so far have been incompatible with the existing engines. The cost of replacing all the existing fossil burning engines may be so high that it may render any solution based on alternate fuels unacceptable, at least in a short term basis.

Water as a source of fuel has been suggested by many in the past and numerous experiments have been conducted testing such systems. The basis of such experiments is the fact that water can be separated in to hydrogen and oxygen and the resulting stoichiometric mixture can be fed to an internal combustion engine to generate power. However past experiments yielded unsatisfactory results. The main obstacle to their success is based on the fact that the energy required to separate the water into its components is much greater than the energy produce by the engine. In addition the amount of $H_2$ mixture needed to run a typical automotive engine is too large to make such a system practical.

Systems are presently available on market that can be used as accessories or add-ons to internal combustion engines using fossil fuels, however independent tests have shown that, in fact, these systems have very little, if any, effect on the overall efficiency of the engine.

A system developed by the present inventors is described in two co-pending applications includes means of generating from water and supplying a small amount of hydrogen/oxygen gas mixture into a standard internal combustion engine. (See U.S. Patent Application Publications 2010/0122902 and 2011/0203917). More specifically, these co-pending applications describe an efficient process and apparatus for generating a two-to-one mixture of hydrogen and oxygen, commonly referred to as brown gas or HHO. The mixture helps increase the efficiency of the conventional internal combustion engine by burning the fossil fuel more efficiently. While this latter system is much more efficient than previously described systems, its efficiency is still limited by the amount of hydrogen and oxygen produced on board a vehicle. Moreover, the internal combustion engine described is still burning a fossil fuel.

BRIEF SUMMARY

Briefly, an internal combustion engine includes a cylinder with a combustion chamber having a variable volume as defined by a reciprocating piston in a generally conventional mariner. Hydrogen and air are initially fed into the combustion chamber. Then, a fuel in the form of fine droplets of liquid is injected into the compressed combustion chamber. The resulting liquid/gas mixture is then compressed to a very high pressure, which causes the temperature to rise, and an ignition device causes combustion. The combustion results in hot and pressurized gases that cause the piston to move and generate power. Advantageously, the fuel consists essentially of water and a flammable substance. The flammable material is an alcohol, acetone, aldehyde or other flammable, preferably non-fossil substance that is soluble in water. (The term non-fossil is used to refer to a fuel that is not derived substantially from fossil-base, non renewable materials, such oil or natural gas, but from a renewable source.) Preferably the fuel contains approximately 10-40% flammable material by volume.

The system and method described herein can be adapted to any engine such as rotary and jet engines and are not limited to a piston based as long as the engine can be used to implement the basic principle of the disclosure. This basic principle includes (1) mixing hydrogen and air with a solution of water and a flammable, water soluble fuel (2) compressing the mixture to a high pressure to create high heat and a very explosive mixture in a combustion chamber, and (3) igniting the explosive mixture to cause the sudden expansion of such gases and the formation of steam thereby generating mechanical power.

In accordance with one embodiment of the present disclosure, an internal combustion engine for use with only non-petroleum fuel is provided, the engine including at least one cylinder having a combustion chamber, an intake manifold in selective fluid communication with the combustion chamber, a hydrogen source configured to provide hydrogen and an oxygen source configured to provide oxygen, at least one of the hydrogen source and the oxygen source in fluid communication with the intake manifold to provide at least one of hydrogen and oxygen to the combustion cylinder through the intake manifold. The engine further includes a fuel source configured to provide a fuel consisting essentially of water and a non-petroleum flammable substance, a fuel injector configured to selectively deliver the fuel from the fuel source to the combustion chamber, at least one piston in the at least one cylinder and structured to move within the at least one cylinder and compress the hydrogen, oxygen, and fuel together in the combustion chamber, and an ignition device configured to ignite the compressed hydrogen, oxygen, and fuel in the combustion chamber to generate power.

In accordance with another aspect of the present disclosure, a method is provided for generating power using a non-fossil fueled internal combustion engine, the method including the steps of: introducing hydrogen and oxygen into a combustion chamber of the internal combustion engine, the introducing including introducing at least one of the hydrogen and the oxygen into the combustion chamber via an intake manifold; introducing a non-petroleum fuel consisting essentially of water and a flammable substance into the combustion chamber using a fuel injector; compressing the hydrogen, oxygen, and the fuel with a piston in the combustion chamber; and igniting the compressed hydrogen, oxygen, and fuel in the combustion chamber to create hot compressed gases and generate power.

BRIEF DESCRIPTION OF THE SEVERAL VIEWS OF THE DRAWINGS

FIGS. 2A and 2B show sectional and side views of some elements of an internal combustion engine constructed in accordance with this disclosure;

DETAILED DESCRIPTION

Figure 1:
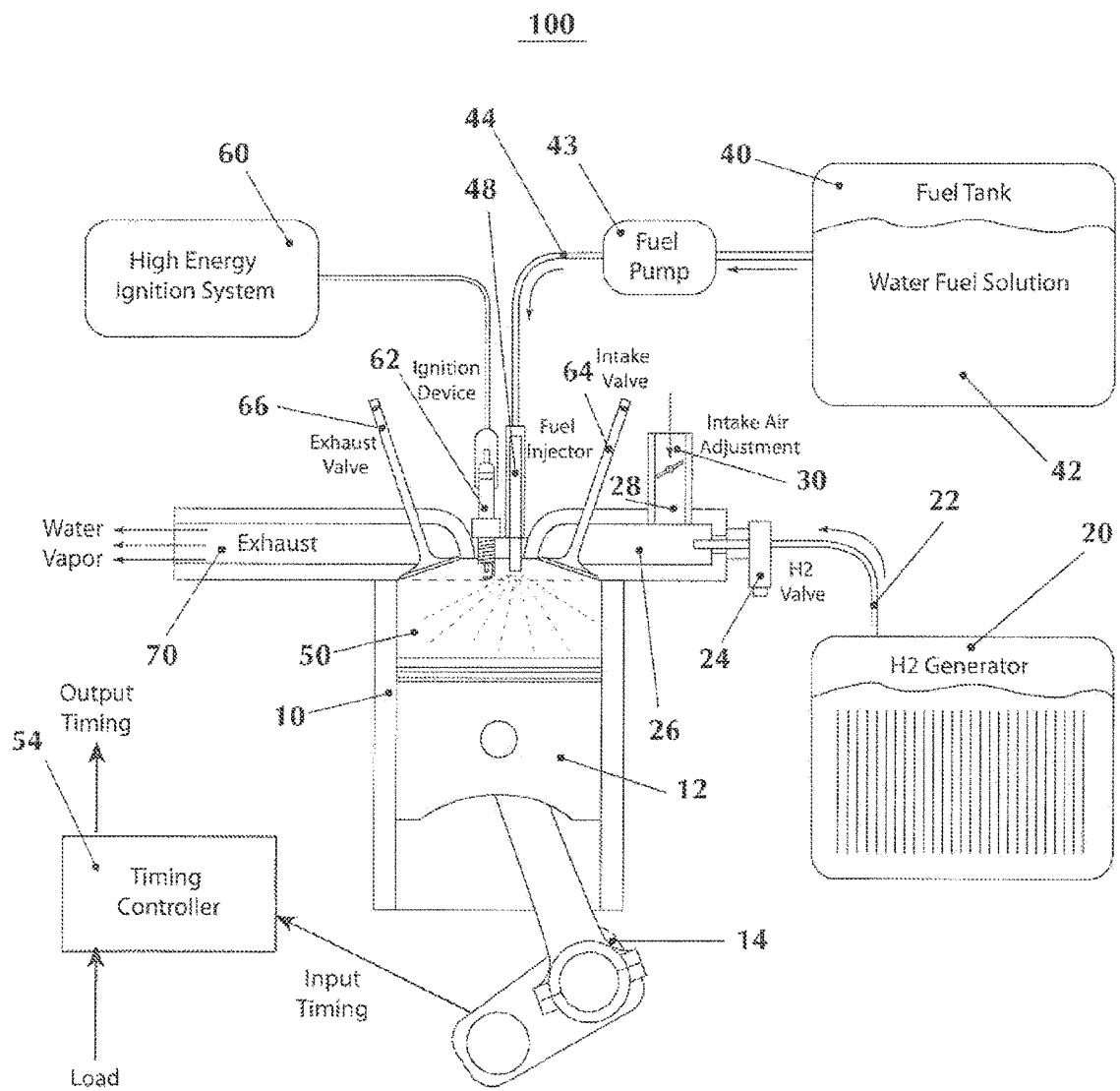
FIG. 1 shows a first embodiment of the disclosure in which $H_2$, air and an aqueous solution forming a fuel is introduced directly into the combustion chamber of the engine with the $H_2$ and the air being introduced through a common intake.

FIG. 1 shows an engine 100 constructed in accordance with this disclosure. The engine includes a cylinder 10, with a reciprocating piston 12 driving a shaft (not shown) through a linkage 14. For example, an experimental engine 100 was constructed by the inventors, by modifying a generic, off the shelf 400 cc Diesel engine. The engine 100 further includes a conventional air intake manifold 26 with an air intake 28 and a butterfly-type adjustment valve 30, an intake valve 64, an exhaust valve 66, an exhaust manifold 70 and a fuel injector 48.

In a conventional four cycle Diesel engine, air is sucked in through manifold 26 into the combustion chamber 50 of the cylinder 10 while the piston 12 moves down. The intake valve 64 than closes, the piston 12 moves up and a Diesel fuel is injected by the injector 48 into the chamber 50. The piston 12 compresses the mixture of air and fuel and combustion occurs. The piston 12 then moves down to drive the shaft and moves up again, and the exhaust valve 66 opens exhausting the remaining gases through the exhaust manifold 70.

The modified engine 100 further includes a hydrogen source 20. In one embodiment, source 20 is implemented as a reactor that generates a stoichiometric $H_2/O_2$ gas mixture (herein referred to as brown gas) from water using electrolysis process. An example of such process is described in more detail in U.S. Patent Application Publications 2010/0122902 and 2011/0203917. The brown gas is fed through a tube 22 and a valve 24 into intake manifold 26. It should be understood that the amount of brown gas introduced into the intake manifold as compared to the amount of air (that inherently also includes oxygen) is so small that the oxygen from the brown gas is negligible and can be ignored. In effect, the brown gas generator is used as a source of hydrogen. Obviously, other types of hydrogen generator can be used as alternatives to the brown gas generator as well.

The intake manifold 26 also receives ambient air through the air intake 28 and, as will be discussed in more detail below, the amount of air flowing into the chamber 26 is controlled by the valve 30.

The engine 100 further includes a fuel tank 40 holding a fuel 42. The fuel 42 is provided through a tube 44 by pump 46 to the fuel injector 48.

The fuel in the fuel tank consists essentially of water and a flammable substance soluble in water. More specifically, it is believed that the flammable substance should be 30% soluble in water by volume. The flammable substance may include, alcohol, acetone, aldehyde and other similar, preferably non-fossil substances or mixtures thereof. In a preferred embodiment, the flammable substance is an alcohol selected from iso-propyl alcohol, iso butanol, propyl alcohol, butyl alcohol, ethyl alcohol, methyl alcohol or a mixture of such alcohols.

Alternatively, the flammable substance is one of formaldehyde, acetaldehyde, butyraldehyde, benzaledehyde, cinnamaldehyde, tolualdehyde, furfural, retinaldehyde, glyoxal, malondialdehyde, succindialdehyde, glutaraldehyde, phtalaaldehyde or mixtures thereof.

The concentration of the flammable material can be in the range of 5%-40%, and preferably 10%-35%. The inventors have found that, in particular a mixture of about 70% water to 30% isopropyl alcohol is particularly advantageous in that it provides a favorable cost vs. performance characteristics.

The fuel 42 from the fuel tank 40 is provided to the fuel injector 48 by pump 43 at a pressure in the range of 200-3,000 PSI. In one embodiment, the fuel is injected at a pressure of about 2000 PSI. Systems have been proposed in the past in which water has been separated via electrolysis into $H_2/O_2$ mixture and then was fed in to the engine intake system. The main fuel used in such known engines was a fossil fuel. In the present engine 100, the fuel 42 is essentially an aqueous mixture of a flammable material, preferably with no fossil components.

The engine 100 also includes a high-energy ignition system 60 providing electrical current to an ignition device 62 (such as a standard spark plug) extending into the chamber 50 as shown. The system 60 and spark plug 62 are conventional components used for internal combustion engines using gasoline as fuel.

A timing controller 54 (typically including a microprocessor—not shown) receives input timing signals and a load signal indicative of the load on the engine 100. The input timing signals are typically derived from the position of the crankshaft (not shown). The load signal is indicative of the load on the engine 100 are derived using conventional techniques. In response, the timing controller generates output timing signals that control the operation of ignition device 62, fuel injector 48, valve 24 and air intake valve 30, valves 64 and 66 open and close it controlled by a traditional camshaft (not shown).

Importantly, the engine 100 operates at a very high compression ratio. Typically, a conventional combustion engine operates at a compression ratio of around 15/1 to 18/1, except for some very special engines, such as the engines used car racing. The present disclosure can be constructed to operate in the range of 10/1-40/1, and preferably in the range of 25/1-35/1 or in the range of 15/1 to 30/1. An optimal compression ratio is about 30/1. This high compression ratio can be achieved by shaping the head of the top of the piston to reduce the volume of the combustion chamber. For example, as shown in FIGS. 2A and 2B, the top surface of the piston 12 can be shaped with an indentation 70. This indentation has a predetermined size and shape selected to provide the required compression ratio and to generate turbulence in fuel plume 52. For this purpose, the indentation 70 is placed so that as the piston 12 is moves upward toward the top of the cylinder and the plume of fuel 52 is released by the fuel injector 48, the plume 52 using the shape of the surface of the indentation causing it to swirl.

In one embodiment of the disclosure, a single plume 52 is released by the fuel injector 48 in every intake cycle. In an alternate embodiment, 1-5 plumes are released, depending on several variables, such as the type of fuel being used, the load on the engine, ambient temperature, etc. If more than the one plume is released, the first plume is released much earlier than the combustion point, to enrich the vapor mixture in the chamber 50, and the other plumes are released just prior to combustion, as well during combustion.

The engine 100 operates in a manner similar to a standard four-cycle internal combustion engine but with some important differences. During the intake cycle, as the piston 12 moves downward, the valves 30, 24 and 64 open to allow air and brown gas to enter into and mix in chamber 50. As explained above, the ratio of brown gas to the volume of the cylinder is very small by volume (about ½%-2%), that the amount of $O_2$ in the brown gas as compared to the amount of $O_2$ in the air is negligible and, and therefore only the hydrogen ($H_2$) is of any real importance. Next, during the compression cycle, valve 64 closes, and the piston 12 moves upward compressing the gases in chamber 50. At a predetermined point, e.g., typically at around 20 degrees btdc (before top dead center), a plume 52 of fine droplets of fuel is injected into the chamber 50 by fuel injector 48 and it mixes with the air/$H_2$ mixture. The piston 12 keeps moving upward compressing further to a very high pressure and temperature which create a very explosive content inside the combustion chamber 50. The mixture in chamber 50 is ignited (typically at top dead center) by spark plug 62 or other ignition device causing combustion that converts the mixture within the chamber 50 into very hot and highly pressurized gases including steam. These gases force the piston 12 to move down in the conventional manner. The next upward movement (exhaust cycle) of the piston 12 causes the remains of the combustion to be exhausted through manifold 70. These remains consist mostly of water vapor.

Surprisingly, at substantially no load, it was found that engine 100 can run at 2500 RPM indefinitely, even when the air intake adjustment valve 30 is closed, and therefore almost no air (and, very little oxygen) is provided to the engine. Apparently, during the compression and/or explosion stages least some of the water from the fuel disassociates into $H_2$ and $O_2$ and provides the oxygen necessary for the combustion. The remainder of the water is apparently turning into steam.

As the load on the engine increases, the valve 30 should be opened; otherwise the engine is slowing down and can stops running. The amount of air being introduced through valve 30 is dependent on the load on the engine and, since apparently the air is not needed for the combustion, it is believed that, as the load increases, in order to maintain RPM and produce power against the load, a higher torque is needed, the air is needed as a working gas that create a higher combustion pressure which in turn create a higher torque when is pushing the piston down.

The operating parameters of the engine 100 as described are as follows:

Compression ratio 30/1;

Fuel 70% water 30% iso-propyl alcohol at ambient temperature;

$H_2$ 2-10 l/min at standard atmospheric pressure and ambient temperature;

Air 0-50 l/min at ambient pressure and temperature;

Fuel pressure 200-3000 PSI. An outside range would be 200-10,000 PSI.

If multiple injections are used, the first injection or pilot consists of 5%-30% of the total fuel and the remainder is then rationed during the combustion cycle.

While presently the exact phenomenon occurring in the cylinder portion 50 during explosion is not fully understood, it is believed that some if not all of the water from the fuel mixture also disassociates in the cylinder into $H_2$ and $O_2$ and provides more fuel for conversion which is triggered by the $H_2/O_2$ that is fed in to the chamber. It was found that the process worked well when a volume of 2 ml of the $H_2/O_2$ gas mixture was provided to the engine for every revolution. Since the engine is a 400 ml (or 400 cc) engine. The amount of $H_2/O_2$ provided for each revolution is about ½%-2% of $H_2$ by volume.

As discussed above, the fuel is preferably a solution of water and a flammable liquid substance. In addition an additive can be added, such as a non-corrosive material that increase the conductivity of the water at high pressure during combustion thereby helping the separation of the water to $H_2/O_2$.

The techniques shown can be easily applied multiple cylinder, in addition to a regular piston or a rotary engine, the disclosure can be developed turbine and jet engine as well.

For example a conversion of a Diesel based engine is fairly simple, only the head is needed to be modified in order to introduce the ignition device, a high power ignition system, the shape of the piston and the combustion chamber to allow a suitable compression ratio, and a fairly small $H_2/O_2$ reactor (or other $H_2$ source) need to be added, making this solution an inexpensive and simple to introduce to the market place.

Since water is practically available in any fuel station, no main infrastructure needed to be created. The flammable substance can be automatically mixed with clean water and fed in to the fuel tank of the vehicle.

Figure 3:
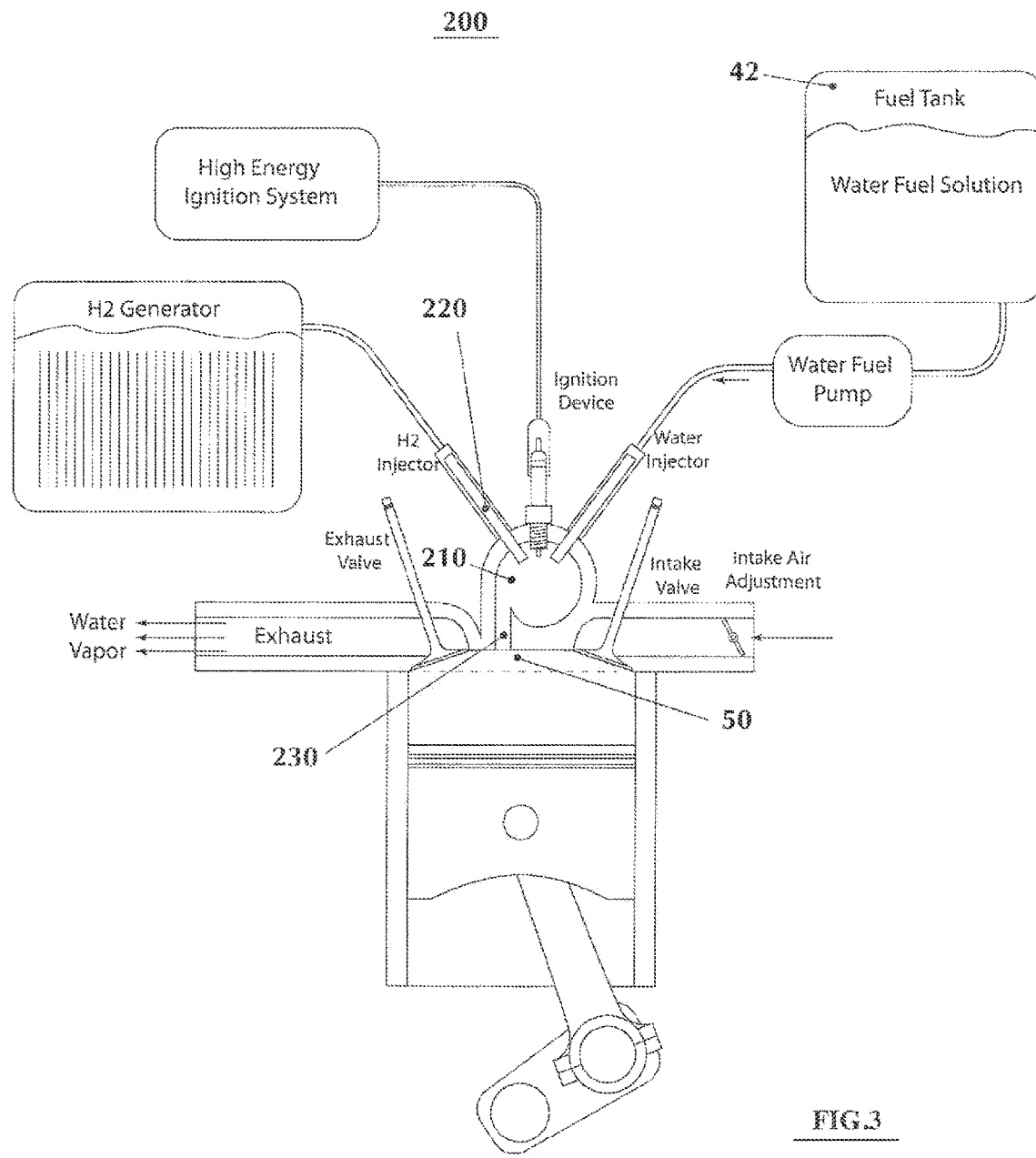
FIG. 3 shows a second embodiment in which the ingredients are first mixed in a mixing chamber before exploding.

FIG. 3 shows another embodiment. In this embodiment, engine 200 is very similar to engine 100. The difference is that a novel mixing chamber 210 is provided at the top of the cylinder 10 in communication with the cylinder portion 50 where the combustion takes place. The $H_2/O_2$ mixture is fed by a second injector 220 into this mixing chamber 210 (rather than into the chamber 50). Thus, the mixing chamber 210 receives both the fuel mixture 42 and the $H_2/O_2$ mixture. These materials mix with each other and are sucked into the portion 50 when required through a channel 230.

Figure 4:
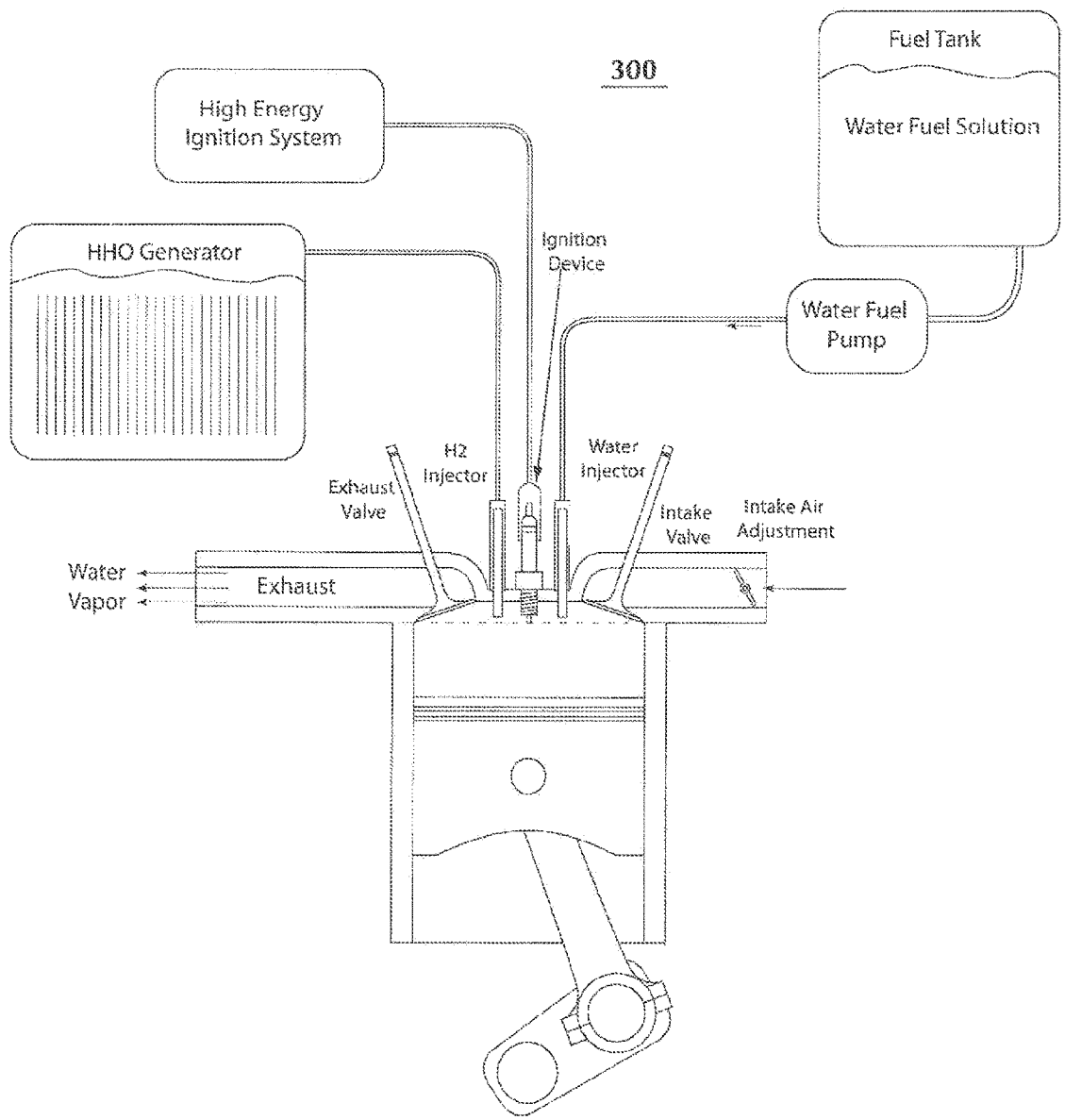
FIG. 4 shows a third embodiment of the disclosure in which air is introduced through the intake manifold and $H_2$ are introduced by way of injection directly to the compression chamber.

FIG. 4 shows another embodiment 300. In this embodiment, the water fuel mixture and the $H_2/O_2$ mixture are both fed directly into the combustion chamber.

In other words, the $H_2/O_2$ mixture can be fed to the engine in three different ways: into the manifold, into a mixing chamber, or into the combustion chamber itself.

The present disclosure has several advantages. First, it makes use of commonly available renewable substances as fuel, instead of relying on non-renewable fossil substances. It is believed that the disclosure is much more efficient and similar engines using on fossil-based fuels and can generate more power. Third, during the experiments performed on the engine, the exhaust from the engine was very clean, minimal pollution being observed, and even in a non-ventilated area there was no visible smoke, nor did the inventor found any difficulty breathing.

Numerous modifications may be made to this disclosure without departing from its scope as defined in the appended claims.

For example, several improvements to the foregoing engine and method have been implemented and tested. An engine originally designed to work on diesel fuel has been modified to work with a water-based fuel. The engine, according to the manufacturer specifications, should produce about 9 HP at 3000 RPM. The engine was tested before implementing the improvements of the present disclosure and in fact it produced a maximum of 7 HP at 2500 rpm. This measurement was done in a laboratory using a water break dynamometer. The instruments used included a Land and Sea 7" water break absorber and a Dyno-Max Data acquisition system.

When converting the engine to work on water-based solution, many different configurations were tested. From the beginning it was observed that while a fairly high torque measurement was achieved at low RPM similar to a diesel based engine, the best performance results were achieved with a compression ratio between 15:1 to 20:1. It was noted that the higher the compression ratio, the higher the torque results.

The first test of the modified engine produced about 2.4 HP at 1500 RPM. Some water exiting the tailpipe was observed, which is a sign of an inefficient burn. In a traditional combustion cycle, once the fuel and air is compressed at top dead center or just before, the fuel is ignited and maximum pressure is created just after top dead canter. With the fuel of the present disclosure, the process of reaching the highest pressure takes longer because the water needs to break in to Hydrogen/Oxygen, then it is ignited. In the next stage the water turns to steam, which further increases the pressure. In order for maximum pressure to be accumulated at top dead center of the piston travel, an advance ignition is required. In the present disclosure an advance ignition of about 20 to 30 degrees was sufficient, depending on the working speed.

In addition the better results were achieved using a "Hot plug" for the spark plug. Furthermore, the cylinder head was modified to accommodate two spark plugs to obtain better results.

Fuel supply was designed similar to a GDI (Gasoline Direct Injection). A cam driven pump was used to produce a high pressure supply, as high as 3000 PSI. In order to reach minimum droplet size at the injector, pressure during the injection needs to be as high as possible. Therefore the injector is configured to be in sync with the pump cam lobe so as to inject the fuel during the lift of the pump piston or just after high pressure is achieved when the pump piston is at the top of its travel in the cylinder.

The improvements mentioned above have showed that by modifying the engine to be more compatible with the fuel demonstrate similar or higher power output. The engine was tested with all the mentioned advancements and modification, and it surpassed the diesel based configuration, producing up to 7.8 HP at 2,000 RPM. In addition, the torque level improved by 10% over the diesel fuel configuration.

Another variation of the present disclosure is the option of injecting the fuel into the manifold instead of directly into the cylinder.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An internal combustion engine for use with a single liquid fuel that is only a non-petroleum water-based fuel, the internal combustion engine comprising:
    at least one cylinder having a combustion chamber structured to combust the single liquid fuel and no other liquid fuel;
    an intake manifold in selective fluid communication with the combustion chamber;
    a source of air in fluid communication with the intake manifold to provide air to the combustion cylinder through the intake manifold;
    a fuel source configured to provide only the single liquid fuel that is only a non-petroleum water-based liquid fuel consisting essentially of water and alcohol;
    a single fuel injector configured to selectively inject only the liquid fuel from the fuel source to the combustion chamber;
    at least one piston in the at least one cylinder and structured to move within the at least one cylinder and compress the air and fuel together in the combustion chamber with a compression ratio in the range of 10:1 to 40:1; and
    an ignition device configured to ignite the compressed air and fuel in the combustion chamber to generate power.

2. The engine of claim 1 wherein the fuel is injected into the combustion chamber at a pressure in the range of 200-10,000 PSI.

3. The engine of claim 1 wherein the compression ratio is 15:1.

4. The engine of claim 1 wherein the fuel consists essentially of 70% water and 30% alcohol and the engine further comprising a hydrogen source that is selective fluid communication with the combustion chamber via a hydrogen injector, and the air source is configured to be in selective fluid communication with the combustion chamber via the intake manifold.

5. The engine of claim 1 wherein the alcohol is ethyl alcohol.

6. The engine of claim 1 wherein the alcohol is a mixture of isopropyl and ethyl alcohols.

7. A method of generating power using an internal combustion engine and a liquid fuel that is only a non-petroleum water-based liquid fuel, the method comprising:
    introducing air into a combustion chamber of the internal combustion engine;
    introducing only one liquid fuel that is only the non-petroleum water-based liquid fuel consisting essentially of water and alcohol into the combustion chamber using a single fuel injector;

compressing the air and the liquid fuel with a piston in the combustion chamber with a compression ratio in the range of 15:1 to 40:1; and igniting the compressed air and liquid fuel in the combustion chamber to generate hot compressed gases and generate power.

8. The method of claim 7 wherein the introducing a fuel comprises injecting the fuel into the combustion chamber at a pressure in the range of 200-10,000 PSI.

9. The method of claim 7 comprising mixing the fuel with hydrogen in a mixing chamber prior to the introducing.

10. The method of claim 7 wherein the compressing comprises compressing with a compression ratio of 15:1.

11. The method of claim 7 wherein the introducing only one liquid fuel comprises introducing alcohol that is an ethyl alcohol.

12. The method of claim 7 wherein the introducing only one liquid fuel comprises introducing alcohol that is a mixture of isopropyl alcohol and ethyl alcohol.

13. The method of claim 7 wherein the introducing only one liquid fuel comprises introducing a liquid fuel that consists essentially of 70% water and 30% alcohol.

14. The method of claim 7 wherein the introducing only one liquid fuel comprises introducing a fuel that consists essentially of 70% water and 30% alcohol and the 30% alcohol is a mixture of isopropyl alcohol and ethyl alcohol.

15. The method of claim 7 wherein the introducing a fuel comprises introducing a fuel that consists essentially of 70% water and 30% alcohol and the 30% alcohol is an ethyl alcohol.

16. A vehicle, comprising:
an internal combustion engine that is structured for use with only one liquid fuel that is only a non-petroleum water-based liquid fuel, the engine comprising:
at least one cylinder having a combustion chamber;
an intake manifold in selective fluid communication with the combustion chamber;
a source of air in fluid communication with the intake manifold to provide air to the combustion cylinder through the intake manifold;
a fuel source configured to provide only one liquid fuel in the form of a non-petroleum water-based liquid fuel consisting essentially of water and alcohol;
a single fuel injector configured to selectively inject only the one liquid fuel from the fuel source to the combustion chamber;
at least one piston in the at least one cylinder and structured to move within the at least one cylinder and compress the air and non-petroleum water-based fuel together in the combustion chamber with a compression ratio in the range of 15:1 to 20:1; and
an ignition device configured to ignite the compressed air and fuel in the combustion chamber to generate power.

17. The vehicle of claim 16 wherein the fuel is injected into the combustion chamber at a pressure in the range of 200-10,000 PSI.

18. The vehicle of claim 16 wherein the compression ratio is 15:1.

19. The vehicle of claim 18 wherein hydrogen is introduced into the combustion chamber.

20. The vehicle of claim 18 further comprising a hydrogen source that is configured to be in selective fluid communication with the combustion chamber via an injector and the source of air is configured to be in selective fluid communication with the combustion chamber via the intake manifold.

21. The vehicle of claim 20 wherein the alcohol is ethyl alcohol.

22. The vehicle of claim 21 wherein the compressed air and fuel includes about ½% to 10% hydrogen by volume.

23. The vehicle of claim 16 wherein the fuel consists essentially of 70% water and 30% alcohol and the 30% alcohol is a mixture of isopropyl alcohol and ethyl alcohol.

24. The vehicle of claim 16 wherein the fuel consists essentially of 70% water and 30% alcohol and the 30% alcohol is ethyl alcohol.

25. A method of generating power using an internal combustion engine and a non-petroleum water-based liquid fuel, the method comprising:
introducing air into a combustion chamber of the internal combustion engine;
mixing the fuel with hydrogen in a mixing chamber;
introducing only a non-petroleum water-based fuel consisting essentially of water and alcohol into the combustion chamber using a fuel injector;
compressing the air and the fuel with a piston in the combustion chamber with a compression ratio in the range of 15:1 to 40:1; and
igniting the compressed air, hydrogen, and fuel in the combustion chamber to generate hot compressed gases and generate power.

* * * * *